US010097871B2

(12) United States Patent
Labsky et al.

(10) Patent No.: US 10,097,871 B2
(45) Date of Patent: Oct. 9, 2018

(54) METHODS AND APPARATUS FOR PROVIDING MIXED AUDIO STREAMS

(71) Applicant: NUANCE COMMUNICATIONS, INC., Burlington, MA (US)

(72) Inventors: Martin Labsky, Praha (CZ); Ladislav Kunc, Hlusice (CZ); Jan Vystrcil, Prague (CZ); Tomas Macek, Praha (CZ); Jan Kleindienst, Nove Straseci (CZ); Nils Lenke, Rheinbach (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 15/507,255

(22) PCT Filed: Sep. 12, 2014

(86) PCT No.: PCT/US2014/055326
§ 371 (c)(1),
(2) Date: Feb. 28, 2017

(87) PCT Pub. No.: WO2016/039764
PCT Pub. Date: Mar. 17, 2016

(65) Prior Publication Data
US 2017/0289598 A1    Oct. 5, 2017

(51) Int. Cl.
*H04N 21/258* (2011.01)
*H04N 21/4786* (2011.01)
*H04N 21/236* (2011.01)
*H04N 21/262* (2011.01)

(52) U.S. Cl.
CPC ..... *H04N 21/25891* (2013.01); *H04N 21/236* (2013.01); *H04N 21/26258* (2013.01); *H04N 21/4786* (2013.01)

(58) Field of Classification Search
CPC ......... H04N 21/25891; H04N 21/4786; H04N 21/236; H04N 21/26258
See application file for complete search history.

(56) References Cited

U.S. PATENT DOCUMENTS

| 6,769,028 | B1* | 7/2004 | Sass | .................. H04L 29/12047 348/E7.071 |
| 7,840,868 | B2* | 11/2010 | Kim | ...................... H04H 20/55 714/755 |
| RE43,715 | E | 10/2012 | Mitchell et al. | |
| 2002/0123928 | A1 | 9/2002 | Eldering et al. | |
| 2003/0001880 | A1* | 1/2003 | Holtz | ................. G06F 17/30017 715/716 |

(Continued)

OTHER PUBLICATIONS

PCT International Preliminary Report for Application No. PCT/US2014/055326 dated Mar. 14, 2017; 7 Pages.

(Continued)

*Primary Examiner* — Hoang Vu A Nguyen Ba
(74) *Attorney, Agent, or Firm* — Daly, Crowley Mofford & Durkee, LLP

(57) ABSTRACT

Methods and apparatus to receive a first data stream, such as a public broadcast, and receive a second data stream, such as a private data stream, containing emails, for example. A user profile can be used to generate a data output stream for the user from the first and second data streams. The user profile can contain preferences for segments within the first and second data streams.

24 Claims, 6 Drawing Sheets

(56) References Cited

U.S. PATENT DOCUMENTS

| | | | | |
|---|---|---|---|---|
| 2004/0039796 | A1* | 2/2004 | Watkins | H04H 60/07 709/218 |
| 2006/0059517 | A1* | 3/2006 | Thelen | G06F 17/30035 725/46 |
| 2007/0237136 | A1 | 10/2007 | Sako et al. | |
| 2008/0021976 | A1 | 1/2008 | Chen et al. | |
| 2008/0242221 | A1 | 10/2008 | Shapiro et al. | |
| 2014/0274089 | A1* | 9/2014 | Hassan | H04W 40/20 455/452.1 |
| 2016/0350065 | A1* | 12/2016 | Markovitz | G10L 13/00 |

OTHER PUBLICATIONS

Macek et al.: "Mostly Passive Information Delivery in a Car", IBM Prague R&D Lab, Proceedings of the 5$^{th}$ International Conference on Automotive User Interfaces and Interactive Vehicular Applications (AutomotiveUI, 13), Oct. 28-30, 2013, Eindhoven, The Netherlands, p. 250-253. 4 pages.

Macek et al.: "Mostly Passive Information Delivery in a Car", IBM Prague R&D Lab, Conference Poster, Proceedings of the 5$^{th}$ International Conference on Automotive User Interfaces and Interactive Vehicular Applications (AutomotiveUI, 13), Oct. 28-30, 2013, Eindhoven, The Netherlands, 1 page.

Vystrcil et al.: "Mostly Passive Information Delivery—a Prototype", IBM Prague Research and Development Lab, Proceedings of the EACL 2014 Workshop on Dialogue in Motion (DM), pp. 53-57, Gothenburg, Sweden, Apr. 26-30, 2014, p. 53-57, 5 pages.

Vystrcil et al.: "Mostly Passive Information Delivery—a Prototype", IBM Prague Research and Development Lab, Conference Poster, Proceedings of the EACL 2014 Workshop on Dialogue in Motion (DM), pp. 53-57, Gothenburg, Sweden, Apr. 26-30, 2014, 1 page.

5$^{th}$ International Conference on "Automotive User Interfaces and Interactive Vehicular Applications", Automotive'UI 13, Eindhoven, The Netherlands, Oct. 27-30, 2013, 2 pages.

"Dialogue in Motion", EACL 2014 workshop, Gothenburg, Sweden, Apr. 26, 2014, 2 pages.

Radio One—Mostly Passive Information Delivery in a Car, IBM Prague Research Lab, Oct. 24, 2013, YouTube, 1 page.

Notification of Transmittal of the International Search Report and the Written Opinion of the International Searching Authority, or the Declaration, PCT/US2014/055326, dated May 19, 2015, 11 pages.

* cited by examiner

| type | sub | rating | timing | priority |
|---|---|---|---|---|
| PUBLIC (302) | | (340) | (350) | (360) |
| music (308) | | | 24/7 | 7 |
| | heavy metal (318) | never (342) | | |
| | country (320) | 3 | | |
| | 80's (322) | 8 | | |
| news (310) | | | 7-10AM | 9 |
| | local (324) | 2 | | |
| | national (326) | 7 | | |
| | international (328) | 4 | | |
| | ⋮ | | | |
| | sports (330) | 9 | | |
| weather (312) | | | 8-8:10AM | 10 |
| | local (332) | 10 | | |
| | national (334) | | | |
| traffic (314) | | | 7-7:30AM/ 5:30-6:30PM | 10 |
| | custom (336) | 10 | | |
| PRIVATE (304) | | | | |
| email (370) | | 5 (376) | 24/7 | 6 |
| | sender A (372) | 10 (374) | | |
| | sender B | 2 | | |
| | ⋮ | | | |
| | sender N | 1 | | |
| calender (380) | | | 24/7 | 8 |
| | event | 10 | | |
| misc (390) | | | 24/7 | 5 |
| | joke (392) | 5 | | |

*FIG. 3*

METHODS AND APPARATUS FOR PROVIDING MIXED AUDIO STREAMS

CROSS REFERENCE TO RELATED APPLICATIONS

This application is a National Stage application of PCT/US2014/055326 filed on Sep. 12, 2014, and entitled "Methods And Apparatus For Providing Mixed Data Streams", which is incorporated herein by reference.

BACKGROUND

People often use multiple infotainment streams like radio or TV stations to watch or to listen to their favorite entertainment content and to spot information relevant to them. One recent trend is an increasing demand for customization of the consumed content. This demand is partially being met by interactive 'smart' TVs and by online content providers. While smart TVs bring improved search and navigation functions across the content of many stations and across time, some online radios make it possible for users to create their "own" music stations that play just their favorite music. In addition, online video providers, such as www.youtube.com, when used from interactive TVs, provide the experience of completely custom TV channels. There is an emerging group of mobile services, such as STITCHER, that allow for composing various podcasts based on user's choice into a continuous audio stream that can be navigated. The content served by the abovementioned services is composed almost exclusively of publicly available information like news, music, advertisements etc.

Users also like to consume their own personal information like calendar or email summaries. This is particularly true when users are "on the go"—be it in their cars or while listening to audio from their smart phones while commuting by means of public transport. However, users on the go often have limited cognitive capacity that they can spend consuming the infotainment stream, as they may be involved in a primary task like driving, walking or running.

SUMMARY

Embodiments of the invention provide methods and apparatus to enable users, such as mobile users, to listen to a customized mix of public and private infotainment sources. Standard public infotainment streams, such as conventional radio broadcasts, can be combined with streams of private information, such as calendar summaries and announcements, summaries of incoming messages, or entire private broadcasts. Segments of conventional infotainment streams can be mixed into a customized private information broadcast using user profile information.

In one aspect of the invention, a method comprises: receiving a public data stream at a stream control module; processing the public data stream to understand content of the public data stream; receiving a private data stream at the stream control module; analyzing a user profile for a user associated with the private data stream; and generating a data output stream for the user from the public data streams and the private data streams based upon preferences in the user profile.

The method can further include one or more of the following features: inserting portions of the private data streams into the public data streams, inserting portions of the public data streams into the private data streams, the private data stream includes emails and the public data stream includes news segments, music segments, and weather segments, and further including inserting the emails into the output data stream, the user profile includes preferences for segments in the public data stream including music, news and weather, the user profile includes preferences for segments in the private data stream including email and calendar events, the user profile includes time-based preferences for segments in the public data stream, the user profile includes a preference to not hear a first type of music, the user profile preferences are modified by online learning, the user profile preferences are preloaded from pre-existing template profiles, determining a slot of a given duration in the public data stream and filling the slot with a segment from the private data stream, adjusting the segment from the private data stream to fit in the slot of the given duration, and/or including TTS parameters to fit the segment into the slot.

In another aspect of the invention, an article comprises: a non-transitory computer-readable storage medium having stored instructions that enable a machine to: receive a public data stream at a stream control module; process the public data stream to understand content of the public data stream; receive a private data stream at the stream control module; analyze a user profile for a user associated with the private data stream; and generate a data output stream for the user from the public data streams and the private data streams based upon preferences in the user profile.

The article can further include one or more of the following features: instructions to insert portions of the private data streams into the public data streams, instructions to insert portions of the public data streams into the private data streams, the private data stream includes emails and the public data stream includes news segments, music segments, and weather segments, and further including inserting the emails into the output data stream, and/or the user profile includes preferences for segments in the public data stream including music, news and weather.

In a further aspect of the invention, a system comprises: a content type classifier module to receive public data streams and classify content of the public data streams; a broadcast understanding module coupled to the content type classifier module to understand the content of the public data stream; a presentation module to receive a private data stream; a user profile module to store preferences for a user for at least one of the public and private data streams; and a scheduler module coupled to the presentation module and the broadcast understanding module to generate an output data stream from the public and private data streams using the user profile.

The system can further include one or more of the following features: the public broadcast includes at least one public radio broadcast, the user profile includes preferences for music, weather, and news, the user profile includes time-based preferences, the user profile preferences are learnt online in the runtime, and/or the user can address public or private broadcast stream items by voice commands.

BRIEF DESCRIPTION OF THE DRAWINGS

The foregoing features of this invention, as well as the invention itself, may be more fully understood from the following description of the drawings in which:

FIG. 3 is a representation of an illustrative user profile having user preference information;

DETAILED DESCRIPTION

Figure 1:
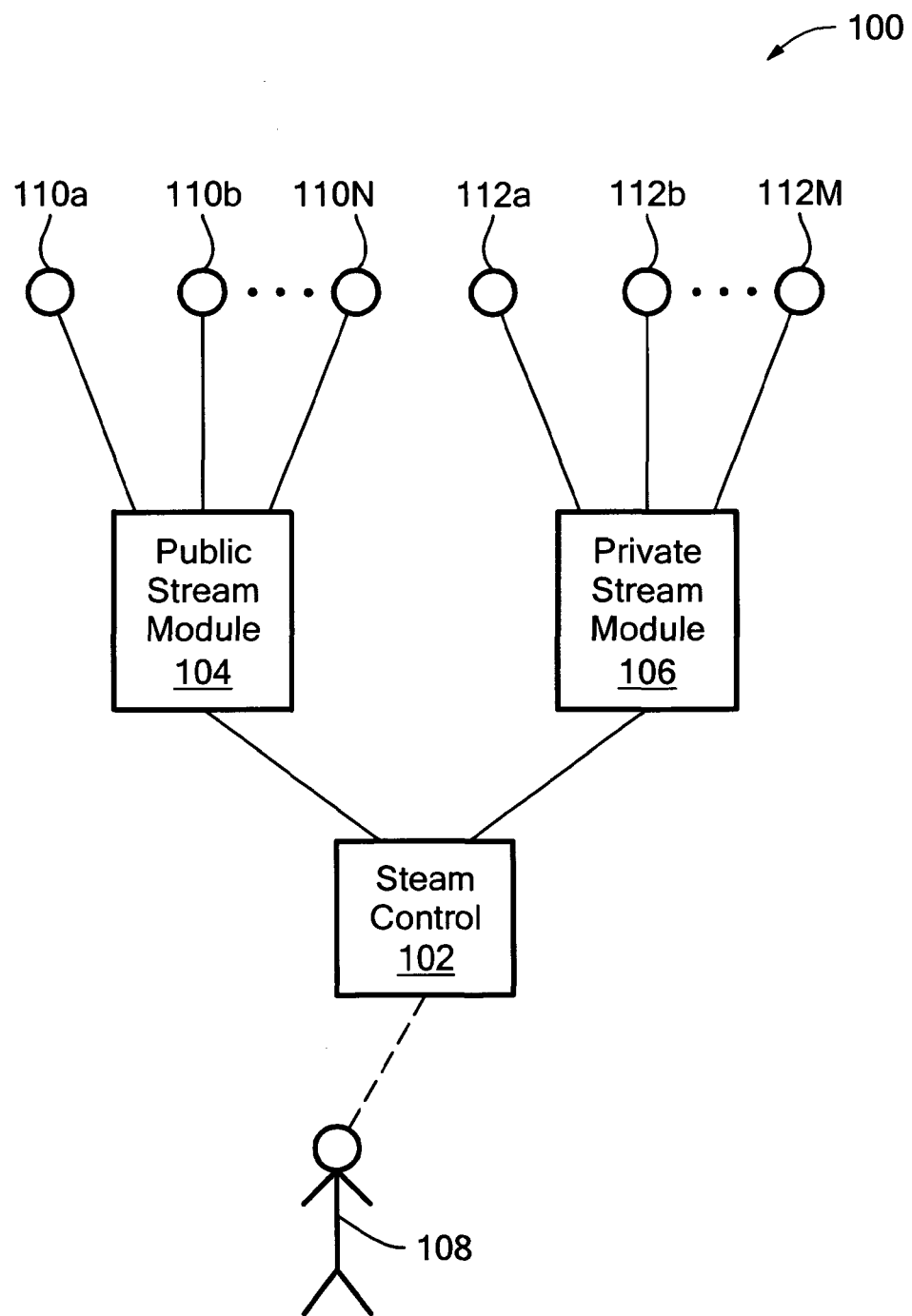
FIG. 1 is a schematic representation of a system to provide an output stream mixed from public and private data streams.

FIG. 1 shows an illustrative system 100 having a stream control module 102 coupled to a public stream module 104 and a private stream module 106 for providing a mixed data stream to a user 108. The public stream module 104 can receive a wide variety of public data streams, such as radio broadcasts 110a, radio station information 110b, programming guide information 110N, and the like. The private stream module 106 can receive a variety of private data streams, such as calendar information 112a, music 112b, emails 112M, and the like. As described more fully below, the stream control module 102 can provide a data stream to the user 108 as a mix of the public and private data streams scheduled in accordance with selected criteria, which can be provided as user preferences.

In embodiments, the user 108 may explicitly configure a profile by expressing preferences including, for example, level of interest in specific infotainment domains, minimal and maximal amounts of information to present from each domain, rules when and under which conditions to play/not-play specific content, rules indicating what kinds of public radio broadcast content (e.g. news, commercials, music) can be replaced by personal content, time ratio of personal content in comparison to public radio broadcast, etc.

Figure 2:
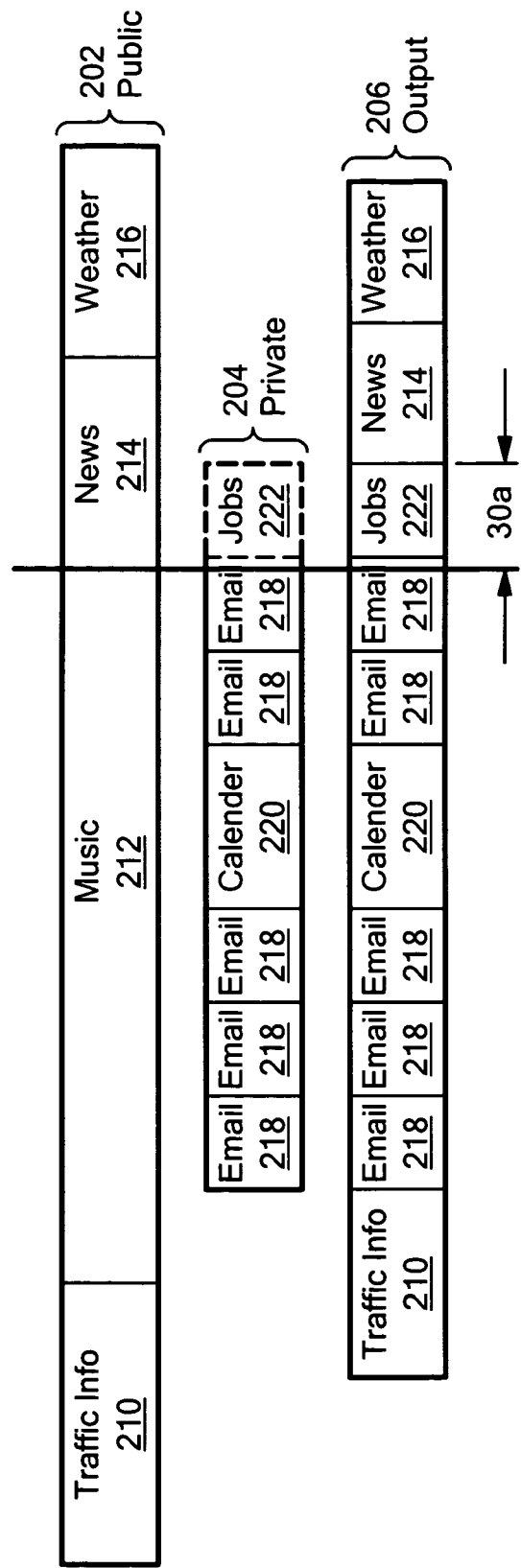
FIG. 2 is a representation of segments in a public data stream, a private data stream and a mixed output data stream.

As shown in FIG. 2, a public broadcast stream 202 can be combined with a private stream 204 to provide an output stream 206 having segments from the public and private streams. In the illustrated embodiment, the public broadcast stream 202 includes a traffic segment 210, a music segment 212, a news segment 214, and a weather segment 216. The illustrated private stream 204 includes a series of emails 218, a calendar segment 220, and a joke segment 222.

The output stream 206 includes the public traffic segment 210, the private emails 218, calendar segment 220 and joke segment 222, followed by the public news segment 214 and weather segment 216. The output stream 206 can be formed based on user preferences contained in a user profile, as described more fully below. In addition, segments in the public and/or private streams can be delayed to enhance the user experience for the output stream.

FIG. 3 shows an illustrative user profile 300 that can be used to generate an output data stream from multiple streams based upon user preferences. The user profile can include preferences for public 302 and private 304 streams. The illustrative public stream preferences include segment types 306 shown as music 308, news 310, weather 312, and traffic 314, each of which can include subtypes 316. Music subtypes can include heavy metal 318, country, 320 and 80's 322, and so on. News subtypes can include local 324, national 326, international 328, sports 330, etc., weather subtypes can include local 332 and national 334, and traffic subtypes can include custom information 336, such as traffic on routes typically used during commuting to work, for example.

The user can provide ratings 340 for types and subtypes. For example, a user can specify that heavy metal should never 342 be part of an output stream, while country can be given a rating of "3" on scale of 1 to 10, where 10 is highly desirable and 1 is highly undesirable. Other types and subtypes can be given ratings as shown. A timing 350 preference can also be provided by the user to facilitate certain segments being part of the output stream at certain times. For example, a user may desire to hear traffic 314 prior to beginning a commute to the office. As shown, the user may specify traffic segments on a public broadcast to be played between 7:00 am to 7:30 am and 5:30 pm to 6:30 pm. In addition, a priority 360 preference may be specified by the user. For example, at the specified times, traffic is given highest priority to maximize the likelihood that traffic segments 314 will be part of the output stream.

The user can also specify preferences for private streams 304. For example, email 370 preferences can include priorities for a list of senders so that sender A 372 can have a priority 374 of "10," which will result in sender A emails being placed in the output stream quickly. As shown, other senders, shown as sender B . . . sender N, can have different priorities. Email 370 can be given a general rating 376 indicating how much in general a user wishes to hear emails in the output stream. Timing 350, such as twenty-four/seven, can also be assigned to email or senders individually. A priority 360 can also be assigned to various components of the private stream, such as calendar 380 and miscellaneous 390, which can include jokes 392 and other types of infotainment.

For selected domains, the granularity of items that the user may specify interest via a user profile can be relatively fine, such as for music or news, e.g., a music profile may indicate that a user never wants to listen to heavy metal music; a news profile may capture user interest in domestic news about culture, etc. In embodiments, a particular musical artist may be given a priority. For example, Frank Sinatra songs can be given highest priority so that a Frank Sinatra song detected on public broadcasts should be played over other artists.

In general, the information in the user profile 300 can be expressed as sets of rules. The user profile information can be obtained in a variety of ways, such as direct interaction with a user during a training process, for example, as well as ongoing dynamic interaction, which can include online learning in an autonomous, unsupervised manner. Online learning is enabled by allowing the user to interact with the infotainment stream in several ways, e.g., by skipping segments or songs, using voice commands, and the like. That is, the user may skip forward and backward in a given stream. Skipping forward may mean that the user does not like the current content. Skipping a particular type of content (e.g., emails from a particular sender or song of a certain genre) can form a basis to decrease rating 340 assigned to an email sender, for example. In one embodiment, voice commands can be used in a similar manner with different effects based on the character of the command, e.g. "never play this again," which results in a "never" rating 340 for a song, artist, and/or music subtype 316.

In one particular embodiment, the user profile is configured as described below.

1. Definition of known content types, including news, music, weather, emails, etc.

2. For each content type, multiple parameters can be configured that affect how items of that type get picked by the broadcast scheduler. These parameters are used primarily for scheduling segments of private content into suitable time slots in the public broadcast.

Illustrative parameters include:

Definition of how many information items of that type should be presented in a row, forming a "bundle." This number can be encoded as a range, e.g., bundle size of "3-5" for emails means that the scheduler should normally try to pick between 3 to 5 emails for presentation in a row. The system may present less emails in case there are not that many new emails.

How many times should an item be repeated in case it finished playing normally, and in case it was skipped by the user (both default to 0).

Expected cognitive load caused by listening to each content type, which is used by the scheduler in case it is aware of the user's current cognitive load. For instance, when the system is aware that the user is currently driving in difficult traffic, the scheduler should choose less distracting content for presentation (e.g., play songs instead of reading out emails).

Named categories that each content type belongs to, used for scheduling purposes as described below, e.g., the user profile editor may choose that emails fall under the general category "content," whereas music falls under the category "filler."

Specification of how items of each content type get picked. A number of predefined selection methods can be picked. For example, these include a shuffled rotary list useful for picking user's private songs or for picking jokes or quotes. A priority queue, on the other hand, is suitable for picking the next emails to present, where the priority of an individual email can be computed e.g. from its arrival time and from the email being "high priority" or not. A weighted random selection scheme can be applied to items like news. Picking of news items can be done randomly according to a weight assigned to categories (e.g. user likes sport news more than politics).

3. Scheduling rules that select which parts of the public stream should be replaced by private information items. Conditions of these rules may impose constraints on multiple parameters of the public stream items. Right hand sides of the rules assign a "utility" or "suitability" score (from the user's point of view) to the public stream item matched by the rule; a value of 0 denotes minimum utility (such item will get likely replaced by private items) and 10 denotes high utility. The rules comprise an ordered list and the first matching rule is used to assign utility to each item of the public broadcast. A sample list of rules follows:

[type="news" AND title contains "sport"]→0 would select sport news from any public stream to be replaced by private information items

[station="Country Radio" AND type!="music"]→0 would select, when listening to "Country Radio", any content but songs to be replaced by private items.

[type="news"]→8 would in general assign high utility to newscasts appearing in public streams.

Based on this rule list, known items comprising the public stream are scored with their utility. Based on the assigned utilities, slots in the public broadcast that are suitable for replacement are identified. One possible method to select replaceable slots is to use a utility threshold that may be defined as part of the user profile, and based on this threshold identify all segments of consecutive items having utility lower than the threshold as slots suitable for replacement.

4. Scheduling rules that determine the sequencing of private information items to fit in the available slots in the public stream. The rules are defined by their LEFT and RIGHT hand sides (i.e. LEFT→RIGHT). The processing of rules depends on the order of rules in the list. Rules at the beginning of the list are processed sooner than rules at the end. The scheduler selects the first rule whose LEFT side matches the last content that has been playing or scheduled so far. According to the RIGHT hand side of the rule, it then attempts to schedule a new bundle of information items (consecutive sequence of items sharing their content type, such as 3 email messages following a sequence of songs). In case no bundle can be scheduled according to a matched rule, e.g. because there are no new emails, the list of rules is searched further for a next matching rule. Examples of scheduling rules follow:

[category="content"]→[ category="filler" ] takes care of interleaving information content (like emails or news) with "filler" content (like music or jokes). The left hand side matches an item or consecutive items whose type falls under the category named "content". The right hand side suggests that new bundle of items should be scheduled whose type falls under the category "filler".

TRUE [ type="calendar" ] shows a rule whose left side always matches. Such a rule, when reached in the scheduling rule list, would always attempt to schedule a new bundle of upcoming calendar items and would succeed if some calendar items could be scheduled.

[type="news"]→[type="weather", 0.7] OR [ type="filler", 0.3] shows a rule having multiple alternative schedules on its right hand side, each equipped with probability of being selected. Other alternative schedules are attempted in case scheduling according to a randomly picked alternative does not succeed, so that a rule with multiple right hand sides only fails if all its alternative schedules fail.

Rules get applied until the scheduled content fills in the available time slot. There may be an overlap or a gap with respect to the following public stream item, which is resolved by adjusting the time shift for the public stream.

Figure 4:
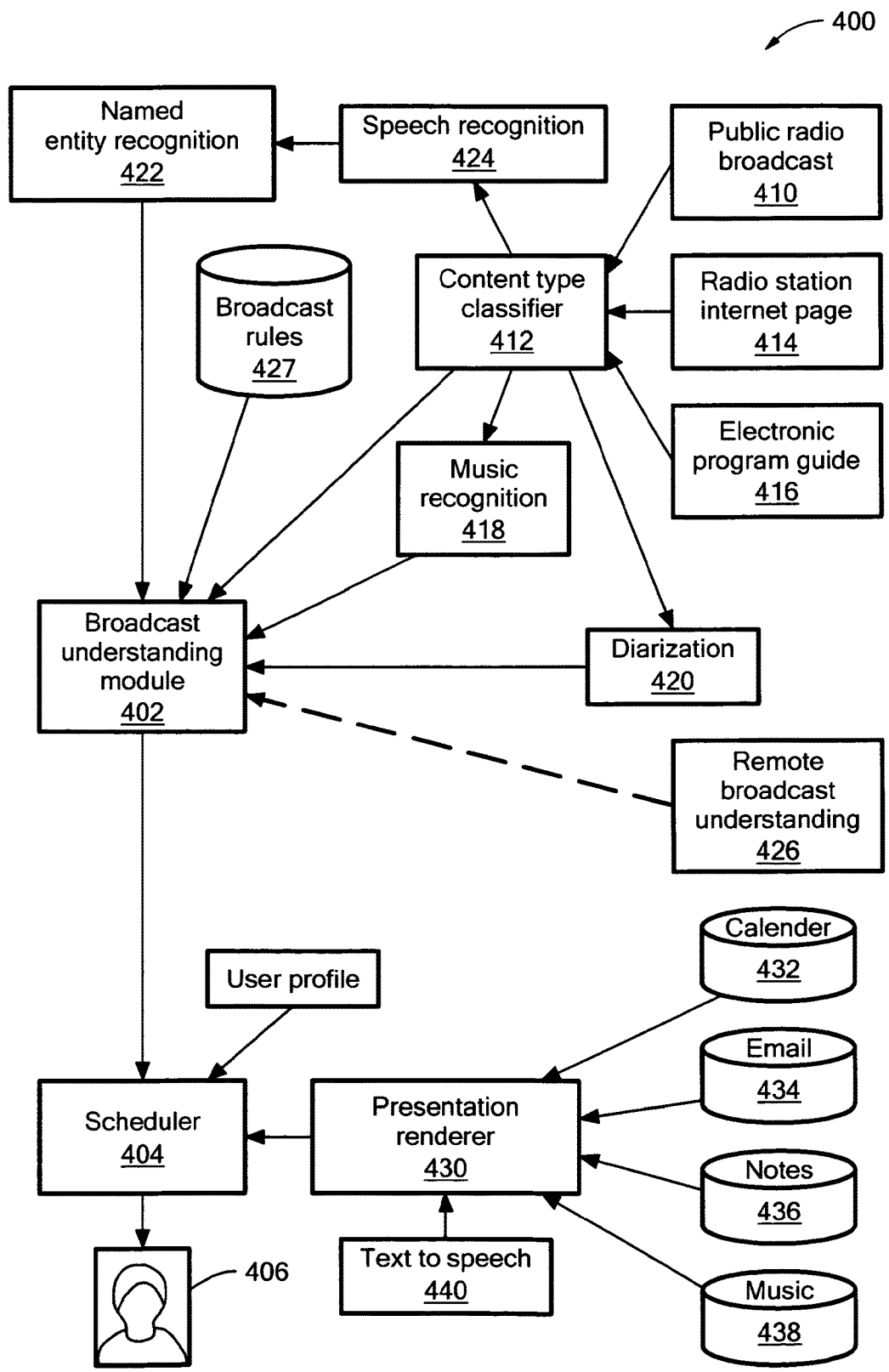
FIG. 4 is a schematic representation of system with more detail for the system of FIG. 1.

FIG. 4 shows additional detail for a system 400 for mixing infotainment streams. A broadcast understanding module 402 receives various data streams and information and provides an output to a scheduler module 404, which generates an output stream for a user 406.

A public radio broadcast stream 410 provides a data stream to a content type classifier module 412. A radio station website 414 and an electronic program guide 416 can also provide information to the content type classifier module 412. For example, radio schedules authored by users/editors (e.g. regular news at full hour, traffic information every 15 minutes in the morning), can also be used, as well as automatic identification of song metadata using services such as GRACENOTE.

It is understood that information from various sources may be used including analog and digital broadcasts. For analog radio broadcasts, the Radio Data System (RDS) can indicate, for example, the content type currently broadcasted, such as traffic announcements, or metadata about the content, such as song or series titles. This information can be used by the content type classifier 412 to process the data streams for the broadcast understanding module 402.

In addition to systems like RDS, captioning and teletext services may be used to extract metadata about television broadcasts. Furthermore, some broadcasts may contain metadata embedded in the audio/video stream such as silent beeps, specific jingles or artificially inserted images that indicate e.g. the beginnings and ends of advertisements. Such information can be used by the content type classifier module 412.

For digital radio broadcasts, there are a number of services available on the web that specialize in recording streamed digital radio broadcasts. Such services can split the recorded streams into logical units, such as shows or songs, and make them accessible online for replay. User interfaces are available to perform searches by title of the show, radio station name, keywords and topics. These services can be directly exploited by the broadcast planner to acquire appropriate recorded public content for mixing into a customized radio broadcast. In one embodiment, a music recognition module 418 coupled between the content type classifier module 412 and the broadcast understanding module 402 can provide this type of processing. A diariazation module 420, which is also coupled between the content type classifier module 412 and the broadcast understanding module 402, can provide detection and splitting of various speakers in the broadcast. Speaker information can be used to select programs moderated by the user's favorite anchor into the output stream.

When a user primarily listens to the public broadcast, radio capture engines, such as the OpenSource STREAMRIPPER, can be used in real-time to "understand" the live broadcast and enable scheduling private content instead of selected public broadcast parts.

The broadcast understanding module 402 can use information from an entity recognition module 422 and speech recognition module 424, which can be coupled to the content type classifier module 412 to detect positions where music or spoken segments start/end. The diarization module 420 can serve a similar function. This processing may be done both locally and remotely to use more powerful recognition/classification resources. Speech recognition applied to the content of spoken segments can also be used to detect topics of the broadcast. Detecting various named entities 422 can enable the user to ask interactive questions by voice like "tell me more," "what is X," "look it up," "add this to my calendar," and the like. Illustrative named entities 422 of interest include news topics, people, events, locations, organizations, Internet links (used to navigate to a webpage or to create a bookmark), phone number (calling this number, saving it to contact list), date/time (e.g. create a calendar event for a cultural event announced by radio), city/location (navigate there), POI (navigate to restaurants, cinemas mentioned), and the like.

The music recognition module 418 provides information to the broadcast understanding module 402 to allow prediction of the length of the currently played song, and optionally, to allow the user to buy the recognized music. Advertisement recognition can provide the user with a possibility to instantly purchase the currently advertised products, order tickets for the announced events, etc. The length of the currently broadcasted slot can be predicted in several ways. For example, rule-based schedules authored by users/editors (e.g. by specifying the typical length of commercial breaks or taking advantage of known start or end times; e.g. ending at full/half hour). The music recognition module 418 can be used to recognize the track playing and retrieve its expected length from a music database.

An electronic program guide (EPG) or meta information published on Internet page can also be used. A remote broadcast understanding module 426 can provide further information to the broadcast understanding module 402, e.g. large vocabulary speech recognition of spoken content. A broadcast rules module 427 includes a database of manually or automatically learned broadcast rules typical to one or more broadcast providers on how they compose their broadcast streams (e.g. the news are typically at full hour, followed by weather and traffic information or that they play two songs at maximum subsequently).

A presentation renderer module 430 is coupled to a series of private data sources, such as calendar 432, email 434, notes 436, and music 438. The presentation renderer obtains a user's personal information, such as emails, calendar events and so on and glues them together using virtual moderators talk to create a private presentation stream. A text-to-speech (TTS) module 440 can also be coupled to the presentation renderer module 430, which provides a means to output private data stream information using artificial human voice. A user profile 431, which can be provided as the user profile 300 of FIG. 3, is coupled to the scheduler.

While the user listens to a favorite public radio station, for example, the scheduler module 404 automatically schedules personalized content for suitable time slots based on the user profile 300 (see FIG. 3). The scheduler 404 determines when personal content should be scheduled, replacing the public radio broadcast at certain times, e.g.: commercial breaks (advertisements) news, music (especially music that is not favored by a user), traffic information, other broadcasts.

Selecting positions to insert personal content can be done after understanding the public broadcast stream. Selecting what personalized content should be presented in the available time slots is performed based on the user profile 300. Potential time slots in a public broadcast stream into which segments from a provide data stream can be determined in a variety of ways. Segments in the public data stream can have predicted times and durations that can be filled by private stream segments. In addition, the system may generate multiple versions for each segment having different lengths. Preferences in the user profile 300 can indicate a preferred order of broadcast information, as well as what kind of public content is to be replaced by what kind of private content.

The output data stream from the scheduler module 404 played to speakers can be delayed to help better understand and process the underlying live stream(s) and generally provide a better user experience. This time shift is useful as it makes it possible to determine the exact length of the replaced broadcasted item, and thus, allows the system to adapt the custom content to better fit into the available time slot. Shifting the broadcasted content for about 30 seconds, for example and shown in FIG. 2, facilitates a read-out of emails, calendar announcements, custom news, etc. Longer personal content, such as custom music, can be stopped at a suitable position and faded out properly to maintain a solid user experience.

As discussed above in conjunction with FIG. 3 and the user profile 300, urgent messages, or messages from a particular sender, can be scheduled to interrupt the public radio broadcast immediately. Custom content can be also presented on an explicit user request, e.g., find a Sinatra song, such as by using buttons, touch screen tiles or voice commands. In the event of the user tuning to a different public radio station, the scheduler module 404 resets the schedule, updates its understanding of the content broadcasted by the new station and creates a new schedule.

When inserting personal information content into the public radio broadcast, the content presentation may also be adapted to the content currently being broadcast, in order to create smoother transitions between the public and personal content. Custom textual content can be presented using a text-to-speech module (TTS) 440 (FIG. 4). Several TTS parameters can be tuned to improve user experience. The sound volume should be set to match the volume of speech in the public broadcast. TTS speed can be adapted in the following manners: adapt the TTS speed to be the same as in public radio broadcast (so as to not degrade the user experience), adapt the TTS speed according to an available slot (speed up the presentation to squeeze the content into a short slot or use lower speed to fit into a longer slot). Although the previously described techniques focused on smoothing of presentation from the multiple sources, the user should be aware about the source of information. It should be clear which information is private information and which information comes from public sources. Acoustic signaling techniques can be used to embed the information to the stream including but not limited to the following: playing a jingle specific for a type of content; playing background music specific for presented information; using female TTS voice if public radio has male speaker and in opposite.

In one embodiment, private infotainment items are inserted into a time-shifted public infotainment stream in accordance with the pseudo code segment below.

```
RadioStream = sequence of public items [R]
PrivateQueue = set of private items [P]
while (radio on) {
    update PrivateQueue (new messages, news, approaching POIs,
    events)
    pick the next live item R from RadioStream
    classify R with "like" score according to the means in Section 2
    if ( (R is not liked AND PrivateQueue is not empty) OR
        there is an urgent personal item in PrivateQueue ) {
            schedule R to be replaced by private content:
            1. estimate the duration of R
            2. select an optimal sequence of private items from
            PrivateQueue that fit into the time slot of R
            3. schedule the sequence of private items for playback once
the previous          item currently playing finishes
    } else {
            schedule R for playback
    }
}
```

In general, the sequencing of private items into an available slot can be done using multiple methods. One possible method is the above described successive application of content scheduling rules comprising the user profile.

Alternatively, graph search methods such as dynamic programming can be utilized to find an optimal sequence of private items to fill in an available time slot. These approaches include finding a sequence of items that maximizes a predefined utility function (or alternatively minimizes a cost function). For the purpose of scheduling private items, possible utility functions take as input the ratings or priorities of the individual items considered for scheduling, as well as the considered sequencing of these items. The content scheduling rules, defined as part of the user profile, can be augmented with utility scores that specify how appropriate each transition is (e.g. a rule expressing transition from a "news" bundle to a "weather" bundle might be assigned a high utility). One possible utility function for use by the graph search algorithm can then be defined as the geometric average of the utilities of all scheduled items and their transitions. A geometric average of the items' and transition utilities is a suitable choice as it produces a utility score that is normalized with respect to the number of scheduled items, and at the same time it is able to enforce hard constraints (e.g. including a "forbidden" item or transition with 0 utility results in 0 overall utility).

In case the chosen optimal sequence of private items does not cover the full duration of the available slot, the system fades in the public infotainment stream, and vice-versa, in case the chosen optimal sequence of private items overlaps duration of the available slot, the system can use time-shift buffering to record and shift a public broadcast to allow finishing a presentation of private stream. This time-shifted buffer can be eliminated in a future broadcast by providing appropriately shorter slot for a private stream. When information about multiple future items is available, e.g., gathered from EPG or when using non-live public broadcast, processing can be modified to schedule private content for several suitable slots in the future.

In one embodiment, a personalized information stream is the primary broadcast. Favorite radio shows selected by the user can be scheduled as items in this personalized stream. The selected publicly broadcasted content can be recorded on background and then it can be inserted into the personalized stream. Alternatively, the use of time shift recording can be replaced by scheduling the personalized information so that the selected public content can be played at the time of the live broadcast.

In embodiments, content skipping can be facilitated using buttons or voice commands. The following applies when mixing private information into a live public stream. Skipping forward while personal information is playing navigates to the next personal item that was scheduled for the live slot. If there is no such item, the system switches to the live stream. On the other hand, skipping forward in the live stream causes the scheduler to switch to the next private information item if available. Skipping backward navigates back to the cached live stream parts and personal information items as they were historically played. Skipping forward while the current position in the stream is in its history navigates the items forward as they were played.

In general, voice commands allow for more user interaction compared to buttons. In addition to navigation ("skip forward", "skip to news"), the user may request specific topics like "domestic news", "news about the elections", "emails from George", "music by the Beach Boys". Negative selection is also natural like "never play this again," "don't read these emails." Once the semantics of the user request is understood (and optionally disambiguated or confirmed), the scheduler resets the schedule and creates a new one reflecting the user request.

Voice commands can be used also to address previously played content e.g., the command "repeat the news about the Earthquake." This can be done for both public and private sources.

Figure 5:
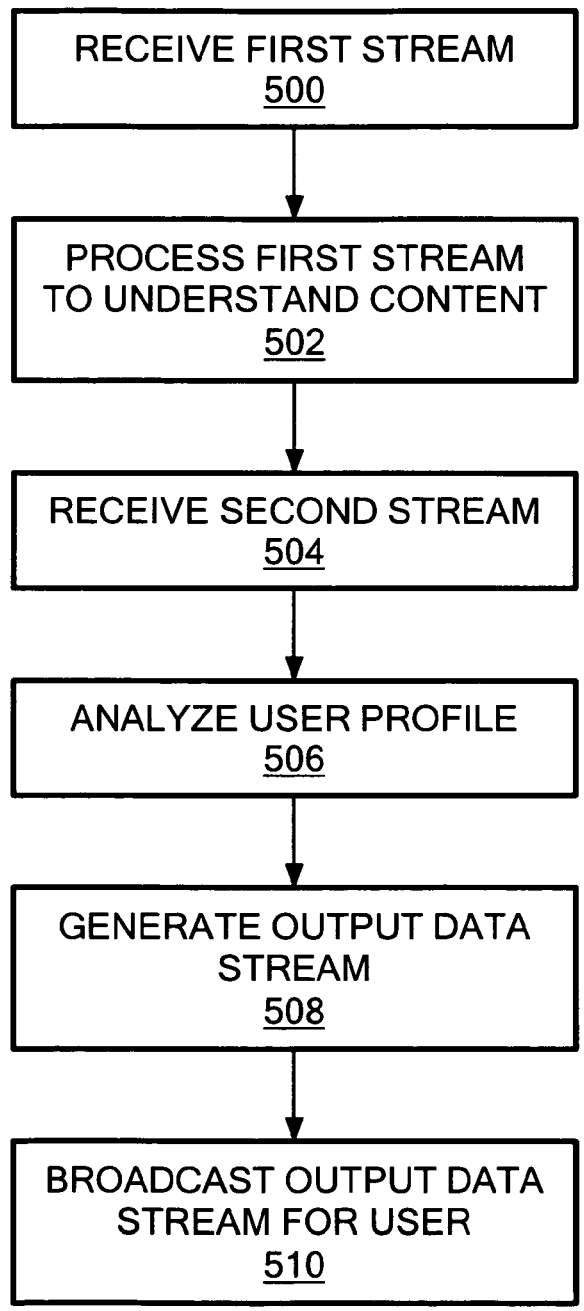
FIG. 5 is a flow diagram of an illustrative sequence of steps to provide a mixed output data stream.

FIG. 5 shows an illustrative sequence of steps to mix multiple data streams. In step 500, a first data stream, such as a public radio broadcast, is received. In step 502, the first data stream is processed to understand the content of the stream segments, such as music, news, weather, commercials, etc. In step 504, a second data stream, such as a private data stream, is processed so that segments, such as emails, calendar events, music, etc., can be scheduled and inserted into the first data stream. In step 506, a user profile is analyzed to determine user preferences for segments in the first and second data streams. In step 508, an output data stream is generated with segments combined from the first and second data streams by using the user profile analysis. In step 510, the output data stream is broadcast to the user.

Figure 6:
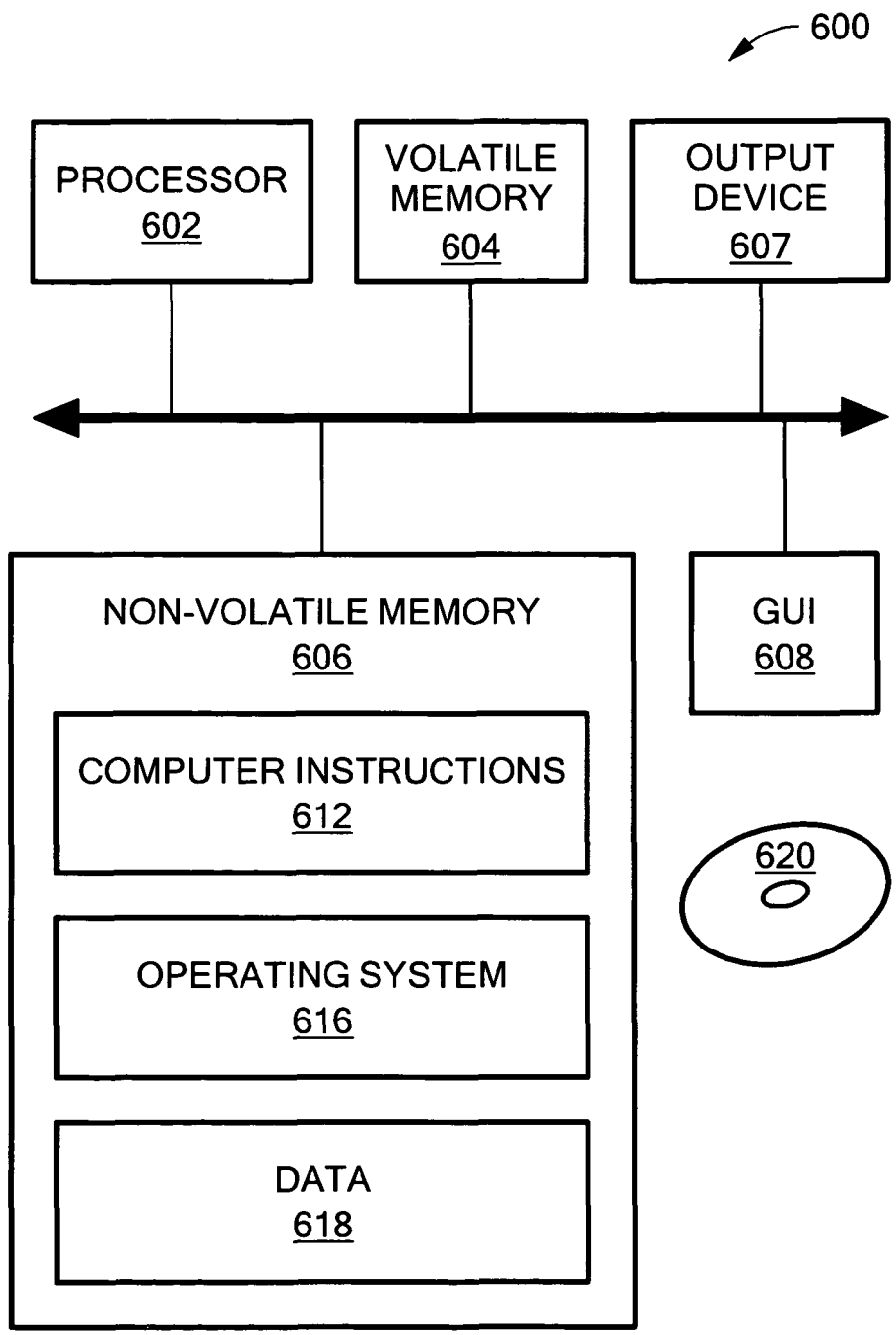
FIG. 6 is a schematic representation of an illustrative computer than can perform at least a portion of the processing described herein.

FIG. 6 shows an exemplary computer 600 that can perform at least part of the processing described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method of mixing a public broadcast audio stream and a private user audio stream for audible output to the user, the method comprising:
    by a content type classifier, receiving the public broadcast audio stream and classifying by type audio content being currently received;
    by a content recognizer, analyzing the audio content being currently received to determine first metadata that pertain to the classified type;
    associating the audio content of the public broadcast audio stream being currently received with the classified type and the first metadata;
    by a renderer, generating the private user audio stream having audio content based on private user data associated with a second content type and second metadata;
    analyzing a user profile storing for the user audio stream mixing preferences associated with at least one of the public broadcast audio and the private user audio streams; and
    automatically generating, and providing to a speaker of the user, an output audio stream from the public broadcast audio and the private user audio streams based upon the audio stream mixing preferences in the user profile, the classified type and first metadata, and the second content type and second metadata.

2. The method according to claim 1, wherein automatically generating the output audio stream includes inserting portions of the private user audio stream into the public broadcast audio stream.

3. The method according to claim 1, wherein automatically generating the output audio stream includes inserting portions of the public broadcast audio stream into the private user audio stream.

4. The method according to claim 1, wherein when the private user data include emails automatically generating the output audio stream includes inserting an audio rendering of the emails into the output audio stream.

5. The method according to claim 1, wherein the user profile includes audio stream mixing preferences for segments in the public broadcast audio stream including at least one of music, news, and weather.

6. The method according to claim 5, wherein the user profile includes audio stream mixing preferences for segments in the private user audio stream including email and calendar events.

7. The method according to claim 1, wherein automatically generating the output audio stream includes evaluating the audio stream mixing preferences for at least one of:
    a priority of, prohibition against, or time-based preference for an audio content type or an audio content subtype;
    an output time ratio between the private user audio stream and the public broadcast audio stream;
    a priority of, or time-based preference for the second content type or the second metadata;
    a number or range of numbers indicating how many items of audio content having a given type should be presented consecutively;
    a number indicating how many times an item of content should be repeated;
    an expected cognitive load caused by the user listening to a given audio content type;
    a user-defined audio content type;
    a scheduling algorithm;
    a broadcast topic; and
    a named entity.

8. The method according to claim 1, in further comprising modifying the user profile preferences based on an ongoing analysis of user interaction with the output audio stream.

9. The method according to claim 1, further comprising preloading the user profile from a pre-existing template profile.

10. The method according to claim 1, wherein automatically generating the output audio stream includes determining a time slot of a given duration in the public broadcast audio stream using the first metadata and filling the time slot with a segment of audio content from the private user audio stream.

11. The method according to claim 10, wherein filling the time slot includes adjusting the segment of audio content from the private user audio stream to fit in the time slot of the given duration.

12. The method according to claim 11, wherein adjusting the segment to fit includes using text-to-speech (TSS) parameters.

13. The method according to claim 1, wherein analyzing the audio content includes recognizing in the audio content being currently received one or more of music metadata, an identity of a person speaking, a spoken word or phrase, a named entity, and a content segment boundary.

14. The method according to claim 1, wherein providing the output audio stream to the speaker includes delaying providing the output audio stream to the speaker for up to 30 seconds.

15. An article, comprising a non-transitory computer-readable storage medium having stored instructions that enable a machine to perform a method of mixing a public broadcast audio stream and a private user audio stream for audible output to the user, the method comprising:
by a content type classifier, receiving the public broadcast audio stream and classifying by type audio content being currently received;
by a content recognizer, analyzing the audio content being currently received to determine first metadata that pertain to the classified type;
associating the audio content of the public broadcast audio stream being currently received with the classified type and the first metadata;
by a renderer, generating the private user audio stream having audio content based on private user data associated with a second content type and second metadata;
analyzing a user profile ting for the user audio stream mixing preferences associated with at least one of the public broadcast audio and the private user audio streams; and
automatically generating, and providing to a speaker of the user, an output audio stream from the public broadcast audio and the private user audio streams based upon the audio stream mixing preferences in the user profile, the classified type and first metadata, and the second content type and second metadata.

16. The article according to claim 15, further including instructions to insert portions of the private user audio stream into the public broadcast audio stream.

17. The article according to claim 15, further including instructions to insert portions of the public broadcast audio stream into the private user audio stream.

18. The article according to claim 15, further including instructions for, when the private user data include emails, inserting an audio rendering of the emails into the output audio stream.

19. The article according to claim 15, further including instructions for recognizing in the audio content being currently received one or more of music metadata, an identity of a person speaking, a spoken word or phrase, a named entity, and a content segment boundary.

20. The article according to claim 15, further including instructions for delaying providing the output audio stream to the speaker for up to 30 seconds.

21. A system for mixing a public broadcast audio stream and a private user audio stream for audible output to the user, the system comprising:
a speaker to audibly output the mixed audio stream to the user;
a memory to store for the user a user profile having audio stream mixing preferences for at least one of the public broadcast audio and the private user audio streams; and
a processor comprising:
a content type classifier module to receive the public broadcast audio stream and to classify by type audio content being currently received;
at least one content recognition module to analyze the audio content being currently received to determine first metdaa that pertain to the classified type;
a broadcast understanding module coupled to the content type classifier module and the at least one recognition module to associate the audio content being currently received with the classified type and the first metadata;
a renderer module to generate the private user audio stream having audio content based on private user data associated with a second content type and second metadata; and
a scheduler module coupled to the presentation module and the broadcast understanding module to generate, and to provide to a speaker of the user, an output audio stream from the public broadcast audio and the private user audio streams based upon the audio stream mixing preferences in the user profile, the classified type and first metadata, and the second content type and second metadata.

22. The system according to claim 21, wherein the processor further comprises an online learning module to modify the user profile preferences stored in the memory based on an ongoing analysis of user interaction with the output audio stream.

23. The system according to claim 21, further comprising a microphone to detect voice commands from the user for controlling one or more of the content type classifier module, the at least one content recognition module, the user profile module, and the scheduler module.

24. The system according to claim 21, wherein the at least one content recognition module comprises one or more of a music recognition module, a diarization module, a named entity recognition module, and a speech recognition module.

* * * * *